(12) United States Patent
Ray et al.

(10) Patent No.: US 9,121,319 B2
(45) Date of Patent: Sep. 1, 2015

(54) LOW PRESSURE DROP, HIGH EFFICIENCY SPARK OR PARTICULATE ARRESTING DEVICES AND METHODS OF USE

(71) Applicant: Universal Acoustic & Emission Technologies, Stoughton, WI (US)

(72) Inventors: Elden F. Ray, Warrenton, VA (US); Jeffrey S. Morgan, Stoughton, WI (US); Fuhe Mao, Fitchburg, WI (US)

(73) Assignee: Universal Acoustic & Emission Technologies, Stoughton, WI (US)

( * ) Notice: Subject to any disclaimer, the term of this patent is extended or adjusted under 35 U.S.C. 154(b) by 150 days.

(21) Appl. No.: 13/653,058

(22) Filed: Oct. 16, 2012

(65) Prior Publication Data

US 2014/0102300 A1    Apr. 17, 2014

(51) Int. Cl.
*B01D 45/00* (2006.01)
*F01N 1/08* (2006.01)
(Continued)

(52) U.S. Cl.
CPC ............... *F01N 1/086* (2013.01); *B01D 45/08* (2013.01); *B01D 45/12* (2013.01); *B01D 45/16* (2013.01);
(Continued)

(58) Field of Classification Search
CPC ........ B01D 45/08; B01D 45/16; B01D 45/12; B01D 46/2411; F01M 13/04; F01N 1/086; F01N 1/12; F01N 1/04; F01N 1/08; F01N 1/082; F01N 3/037; F01N 3/06; F01N 2230/02; F01N 2240/20; Y02T 10/20
USPC ........... 55/391, 447, 448, 457, 428, 429, 430, 55/431, 432–433; 95/272; 96/380, 381, 96/385, 384, 396, 412, 411, 432
See application file for complete search history.

(56) References Cited

U.S. PATENT DOCUMENTS

| | | | |
|---|---|---|---|
| 2,463 | A | 2/1842 | Lewis |
| 429,347 | A | 6/1890 | Haskell |

(Continued)

FOREIGN PATENT DOCUMENTS

WO    2009087270 A1    7/2009

OTHER PUBLICATIONS

Extended European Search Report in corresponding European Application No. 13186255.9, dated Jan. 23, 2014.

*Primary Examiner* — Dung H Bui
(74) *Attorney, Agent, or Firm* — Andrus Intellectual Property Law, LLP

(57) ABSTRACT

Disclosed are devices that include spark or particle arresting, features and muffler features. The disclosed devices may include: (a) an upstream inlet receiving exhaust gas flow; (b) a downstream outlet discharging exhaust gas flow; (c) a cylindrical body disposed between the upstream inlet and downstream outlet; and (d) a particle trap having an opening for collecting particulate matter in the exhaust gas flow, the particle trap disposed downstream of the cylindrical body on a wall of the device. The cylindrical body of the devices typically includes an annular channel permitting axial flow of gas therethrough from an upstream end of the annular channel through a downstream end of the annular channel. The downstream end of the annular channel may be configured to have openings for discharging exhaust gas flow and imparting a spiral flow to the discharged gas flow. As gas exits the annular channel, the particulate matter is forced radially outward via centrifugal force towards the wall of the device where the particulate matter is collected in the particle trap.

19 Claims, 4 Drawing Sheets

(51) Int. Cl.

| | |
|---|---|
| *B01D 45/08* | (2006.01) |
| *B01D 45/16* | (2006.01) |
| *B01D 45/12* | (2006.01) |
| *F01N 3/06* | (2006.01) |
| *F01N 1/04* | (2006.01) |
| *F01N 1/12* | (2006.01) |
| *F01N 3/037* | (2006.01) |
| *B01D 46/24* | (2006.01) |
| *F01M 13/04* | (2006.01) |

(52) U.S. Cl.
CPC .. *F01N 1/04* (2013.01); *F01N 1/08* (2013.01); *F01N 1/082* (2013.01); *F01N 1/12* (2013.01); *F01N 3/037* (2013.01); *F01N 3/06* (2013.01); *B01D 46/2411* (2013.01); *F01M 13/04* (2013.01); *F01N 2230/02* (2013.01); *F01N 2240/20* (2013.01); *Y02T 10/20* (2013.01)

(56) References Cited

U.S. PATENT DOCUMENTS

| | | | |
|---|---|---|---|
| 970,397 A | 9/1910 | Rush | |
| 1,037,326 A | 9/1912 | Roether | |
| 1,215,935 A | 2/1917 | Hickman | |
| 1,304,096 A | 5/1919 | Redeker et al. | |
| 1,784,627 A | 12/1930 | Hamill | |
| 1,840,862 A | 1/1932 | Webb | |
| 2,511,190 A | 6/1950 | Wright | |
| 2,569,909 A | 10/1951 | Umney | |
| 2,646,854 A | 7/1953 | Walker | |
| 2,662,610 A | 12/1953 | Heinrich | |
| 2,732,032 A | 1/1956 | Sandison | |
| 2,886,121 A * | 5/1959 | Welbourn | 181/225 |
| 2,925,884 A | 2/1960 | Campbell | |
| 3,009,539 A | 11/1961 | Papp | |
| 3,064,411 A | 11/1962 | Breslove | |
| 3,216,182 A | 11/1965 | Cochran | |
| 3,374,857 A | 3/1968 | Hutchins | |
| 3,407,575 A | 10/1968 | Krizman | |
| 3,498,233 A | 3/1970 | Dillberg | |
| 3,545,179 A | 12/1970 | Nelson et al. | |
| 3,687,225 A | 8/1972 | Nelson | |
| 3,779,340 A | 12/1973 | Hoffman et al. | |
| 3,805,495 A | 4/1974 | Steel | |
| 3,945,331 A | 3/1976 | Drake et al. | |
| 3,947,731 A | 3/1976 | Vainer | |
| 3,957,471 A | 5/1976 | Tamachi et al. | |
| 3,958,967 A | 5/1976 | Nakamura | |
| 3,969,895 A | 7/1976 | Krizman | |
| 3,986,814 A | 10/1976 | De Mere | |
| 4,011,922 A | 3/1977 | Goplen | |
| 246,038 A | 10/1977 | Moller | |
| 4,147,230 A | 4/1979 | Ormond et al. | |
| 4,180,052 A | 12/1979 | Henderson | |
| 4,198,856 A | 4/1980 | Kaselaan et al. | |
| 4,209,076 A | 6/1980 | Franco et al. | |
| 4,218,228 A | 8/1980 | Hiraoka et al. | |
| 4,222,349 A | 9/1980 | Kadan et al. | |
| 4,226,224 A | 10/1980 | Milligan | |
| 4,241,719 A | 12/1980 | Vickery | |
| 4,259,941 A | 4/1981 | Gerdes | |
| 4,271,815 A | 6/1981 | Johnson | |
| 4,311,494 A | 1/1982 | Conner et al. | |
| 4,317,502 A | 3/1982 | Harris et al. | |
| 4,322,444 A | 3/1982 | Zuilichem et al. | |
| 4,325,460 A | 4/1982 | Hoppenstedt | |
| 4,330,372 A | 5/1982 | Cairns et al. | |
| 4,348,466 A | 9/1982 | Elehew et al. | |
| 4,370,855 A | 2/1983 | Tuggle | |
| 4,385,623 A | 5/1983 | Jacklich | |
| 4,400,754 A | 8/1983 | Schweickardt | |
| 4,409,946 A | 10/1983 | Sandford et al. | |
| 4,424,882 A | 1/1984 | Moller | |
| 4,450,932 A | 5/1984 | Khosropour et al. | |
| 4,487,289 A | 12/1984 | Kicinski et al. | |
| 4,503,389 A | 3/1985 | Singer | |
| 4,553,528 A | 11/1985 | Wells | |
| 4,569,329 A | 2/1986 | Cherryholmes | |
| 4,580,657 A | 4/1986 | Schmeichel et al. | |
| 4,608,963 A | 9/1986 | Townsend et al. | |
| 4,624,241 A | 11/1986 | Cherryholmes | |
| 4,632,216 A | 12/1986 | Wagner et al. | |
| 4,637,792 A | 1/1987 | Davis | |
| 4,651,712 A | 3/1987 | Davis | |
| 4,711,032 A | 12/1987 | Rickmers et al. | |
| 4,727,617 A | 3/1988 | Bardini et al. | |
| 4,727,828 A | 3/1988 | Ueno et al. | |
| 4,780,076 A | 10/1988 | Davis | |
| 4,782,814 A | 11/1988 | Cherryholmes | |
| 4,809,666 A | 3/1989 | Baltz | |
| 4,815,430 A | 3/1989 | Ueno et al. | |
| 4,816,042 A | 3/1989 | Olavson | |
| 4,821,691 A | 4/1989 | Ueno et al. | |
| 4,851,015 A | 7/1989 | Wagner et al. | |
| 4,867,768 A | 9/1989 | Wagner et al. | |
| 4,909,948 A | 3/1990 | Eichelberger, Sr. | |
| 4,958,659 A | 9/1990 | Dowdall | |
| 4,961,403 A | 10/1990 | Kawaguchi et al. | |
| 5,058,704 A | 10/1991 | Yu | |
| 5,107,698 A | 4/1992 | Gilliam | |
| 5,123,501 A | 6/1992 | Rothman et al. | |
| 5,156,114 A | 10/1992 | Gunnerman | |
| 5,159,884 A | 11/1992 | Malick | |
| 5,177,962 A | 1/1993 | Hall et al. | |
| 5,250,094 A | 10/1993 | Chung et al. | |
| 5,251,473 A | 10/1993 | Reese | |
| D343,700 S | 1/1994 | Griffes | |
| 5,325,841 A | 7/1994 | Hooper, Sr. | |
| 5,431,706 A | 7/1995 | Paas | |
| 5,434,407 A | 7/1995 | Bauer et al. | |
| 5,451,728 A | 9/1995 | Chandler et al. | |
| 35,237 A | 5/1996 | Gunnerman | |
| 5,521,339 A | 5/1996 | Despain et al. | |
| 5,555,876 A | 9/1996 | Francisco, Jr. et al. | |
| 5,558,079 A | 9/1996 | Goelz | |
| 5,564,588 A | 10/1996 | Reese | |
| 5,623,958 A | 4/1997 | Bumpers | |
| 5,708,238 A | 1/1998 | Asao et al. | |
| 5,753,800 A | 5/1998 | Gilliam | |
| 5,785,046 A | 7/1998 | Colla | |
| 5,809,989 A | 9/1998 | Nelson | |
| 5,898,140 A | 4/1999 | Asao et al. | |
| 5,902,161 A | 5/1999 | Nakase | |
| 5,904,042 A | 5/1999 | Rohrbaugh | |
| 5,916,136 A | 6/1999 | Ettere | |
| 6,012,285 A | 1/2000 | Lutz et al. | |
| 6,047,767 A | 4/2000 | Bodhaine et al. | |
| 6,062,922 A | 5/2000 | Nanami | |
| 6,119,638 A | 9/2000 | Kennedy | |
| 6,152,817 A | 11/2000 | Daniels et al. | |
| 6,199,345 B1 | 3/2001 | Dean | |
| 6,238,622 B1 | 5/2001 | Salimian | |
| 6,263,851 B1 | 7/2001 | Henmi | |
| 6,282,850 B1 | 9/2001 | Dean | |
| 6,355,904 B1 | 3/2002 | Batdorf et al. | |
| 6,467,569 B2 | 10/2002 | Noe et al. | |
| 6,467,570 B1 | 10/2002 | Herold | |
| 6,540,046 B1 | 4/2003 | Schuhmacher et al. | |
| 6,571,910 B2 | 6/2003 | Storm | |
| 6,591,935 B1 | 7/2003 | Petley | |
| 6,698,394 B2 | 3/2004 | Thomas | |
| 6,712,888 B2 | 3/2004 | Siska | |
| 6,758,875 B2 | 7/2004 | Reid et al. | |
| 6,832,665 B2 | 12/2004 | Crombeen | |
| 6,890,681 B2 | 5/2005 | Mittal et al. | |
| 6,913,011 B1 | 7/2005 | Snider | |
| 6,933,931 B2 | 8/2005 | Lubarsky, Jr. et al. | |
| 6,986,342 B2 | 1/2006 | Thomas | |
| D534,111 S | 12/2006 | Wannamaker | |
| 7,156,202 B2 | 1/2007 | Assad | |
| 7,282,077 B2 | 10/2007 | Honisch et al. | |
| 7,296,657 B2 | 11/2007 | Ohno et al. | |
| 7,367,573 B2 | 5/2008 | Kudo et al. | |

(56) References Cited

U.S. PATENT DOCUMENTS

| | | |
|---|---|---|
| 7,438,003 B2 | 10/2008 | Wilfer |
| 7,469,662 B2 | 12/2008 | Thomas |
| 7,482,705 B2 | 1/2009 | Piercey, III |
| 7,556,674 B2 * | 7/2009 | Andersson ............ 95/267 |
| 7,581,615 B2 | 9/2009 | Karube et al. |
| 7,644,711 B2 | 1/2010 | Creel |
| 7,669,687 B2 | 3/2010 | Takahashi et al. |
| 7,682,232 B2 | 3/2010 | Howard |
| D615,807 S | 5/2010 | Creel |
| D615,814 S | 5/2010 | Creel |
| 7,708,114 B2 | 5/2010 | Shaya |
| 7,726,444 B1 | 6/2010 | Laughlin |
| 7,779,624 B2 | 8/2010 | Belisle et al. |
| 7,811,081 B2 | 10/2010 | Nigro et al. |
| 7,845,465 B2 | 12/2010 | Baumgartner |
| 7,905,321 B2 | 3/2011 | Ballard, III |
| 7,976,801 B2 | 7/2011 | Kammel |
| 7,988,343 B2 | 8/2011 | Palmisano, Jr. |
| 8,132,337 B1 | 3/2012 | Batey |
| 8,132,646 B2 | 3/2012 | Kiesewetter et al. |
| 8,172,930 B2 | 5/2012 | Barkdoll |
| 8,247,738 B2 | 8/2012 | Sithes |
| 8,256,212 B2 | 9/2012 | Miretti |
| 8,281,869 B2 | 10/2012 | Moyer |
| 8,286,421 B2 | 10/2012 | Dickinson et al. |
| 8,286,720 B1 | 10/2012 | Moyer |
| 8,292,981 B2 | 10/2012 | Sithes |
| 8,327,834 B1 | 12/2012 | Judge et al. |
| 2001/0037912 A1 | 11/2001 | Menzel |
| 2002/0059907 A1 | 5/2002 | Thomas |
| 2002/0096392 A1 | 7/2002 | Noe et al. |
| 2002/0121404 A1 | 9/2002 | Storm |
| 2003/0233943 A1 | 12/2003 | Siska |
| 2004/0089500 A1 | 5/2004 | Lewis |
| 2004/0163619 A1 | 8/2004 | Thomas |
| 2004/0200665 A1 | 10/2004 | Adams |
| 2005/0028516 A1 | 2/2005 | Kiesewetter et al. |
| 2005/0224284 A1 | 10/2005 | Ohno et al. |
| 2005/0263344 A1 | 12/2005 | Warfel et al. |
| 2006/0037567 A1 | 2/2006 | Thomas |
| 2006/0048993 A1 | 3/2006 | Karube et al. |
| 2006/0065468 A1 | 3/2006 | Takahashi et al. |
| 2006/0102420 A1 | 5/2006 | Huber et al. |
| 2006/0157295 A1 | 7/2006 | Ziehl |
| 2006/0219476 A1 | 10/2006 | Southway et al. |
| 2008/0023265 A1 | 1/2008 | Frederiksen et al. |
| 2008/0190689 A1 | 8/2008 | Ballard |
| 2009/0013673 A1 | 1/2009 | Mukaida |
| 2009/0133666 A1 | 5/2009 | Thomas |
| 2009/0321181 A1 | 12/2009 | Ballard, III |
| 2010/0011752 A1 | 1/2010 | Edholm |
| 2010/0011754 A1 | 1/2010 | Kiesewetter et al. |
| 2010/0229727 A1 | 9/2010 | Barkdoll |
| 2010/0230205 A1 | 9/2010 | Kobayashi et al. |
| 2012/0210704 A1 | 8/2012 | Kawase et al. |

* cited by examiner

LOW PRESSURE DROP, HIGH EFFICIENCY SPARK OR PARTICULATE ARRESTING DEVICES AND METHODS OF USE

BACKGROUND AND SUMMARY

The field of the invention relates to particulate arresting devices. In particular, the field of the invention relates to devices having low pressure drop, high efficiency spark or particulate arresting features and muffler features.

Many muffler devices require a feature to separate solid particular matter from exhaust or gas flow. Such features sometimes are referred to as "spark arrestors" or "particle arrestors." Spark or particle separation or entrapment typically has been accomplished by utilizing internal piping arrangements to generate a centrifugal flow in an exhaust stream that separates carbon particulate matter from the stream based on the higher density of the particulate matter relative to gas in the stream. This piping typically results in an increased pressure drop, which consequently results in a decrease in engine or machine performance and an increase in energy consumption. For these reasons, muffler devices having a high particulate separation efficiency and low pressure drop are desirable.

SUMMARY

Disclosed are devices that include spark or particulate arresting features and optional muffler features. The disclosed devices may include: (a) an upstream inlet receiving exhaust gas flow; (b) a downstream outlet discharging exhaust gas flow; (c) a cylindrical body disposed between the upstream inlet and downstream outlet; and (d) a particle trap having an opening for collecting particulate matter in the exhaust gas flow, the particle trap disposed downstream of the cylindrical body on a wall of the device. The cylindrical body of the devices typically has an annular channel permitting axial flow of gas therethrough from an upstream end of the annular channel through a downstream end of the annular channel. The annular channel may be configured to impart a spiral flow to gas passing therethrough, for example via flow deflecting devices which may be positioned at the upstream end of the annular channel, at a downstream end of the annular channel, or between the upstream and downstream ends of the annular channel. As gas exits the annular channel, the particulate matter is forced radially outward via centrifugal force towards the wall of the device where the particulate matter is collected in the particle trap.

In some embodiments, the cylindrical body of the devices is an acoustic silencer that includes: (i) an outer sound absorptive element positioned adjacent to an inner wall of the device and forming a cylindrical or frustoconical sleeve of sound absorptive material; and (ii) an inner sound absorptive element positioned inside the outer sound absorptive element, the inner sound absorptive element forming a cylindrical or frustoconical body or sleeve of sound absorptive material. The outer sound absorptive element and the inner sound absorptive element may be spatially positioned relative to each other to form the annular channel therebetween. The outer sound absorptive element and the inner sound absorptive element may comprise absorptive material having a density of about 4-8 lbs/ft$^3$, including but not limited to mineral wool or fiberglass.

In further embodiments, the acoustic silencer element further includes a perforated liner positioned between the outer sound absorptive element and the inner sound absorptive element. The perforated liner may form a cylindrical or frustoconical sleeve which lines the annular channel of the acoustic silencer element. Further, the perforated liner may support an inner surface of the outer sound absorptive element and the liner may support an inner surface of the inner sound absorptive element in a spaced relationship to form the annular channel therebetween. The perforated liner and may have a suffice area that is about 20-40% open permitting access to supported sound absorptive material of the outer sound absorptive element and the inner sound absorptive element. The perforated liner may comprise material including but not limited to metal.

In even further embodiments, the acoustic silencer element further includes radial spokes transversing the annular channel. The radial spokes may support the perforated liner and may support the spatial relationship of the outer sound absorptive element and the inner sound absorptive element which form the annular channel.

The outer sound absorptive element of the acoustic silencing element may be covered or supported by additional structures. In some embodiments, the outer sound absorptive element has an upstream surface covered by a ring, which may be a solid ring, and the outer sound absorptive element has a downstream surface covered by a ring, which may be a solid ring. The rings may comprise material including but not limited to metal.

The inner sound absorptive element of the acoustic silencing element may be covered or supported by additional structures. In some embodiments, the inner sound absorptive element has an upstream surface covered by a circular plate, a flanged and dished head, or a cone. In further embodiments, the inner sound absorptive element has a downstream surface covered by a circular plate. The circular plates, the solid flanged and dished head, and the cone may be solid and may comprise material including, but not limited to metal.

In the disclosed devices, the annular channel may be configured to impart a spiral flow to the discharged gas flow. For example, in some embodiments, the downstream end of the annular channel may include openings with flow deflecting devices which may include louvers. In some embodiments, the devices include louvered openings formed by (i) an inner frame (e.g., an inner cylindrical or frustoconical frame), optionally having axial teeth, the axial teeth having peaks and valleys; (ii) an outer frame (e.g., an outer cylindrical or fustoconical frame), optionally having axial teeth, the axial teeth having peaks and valleys, and (iii) louvers transversing the inner frame and the outer frame, optionally at the axial teeth of the inner frame and the axial teeth of the outer frame. In further embodiments, the louvers may transverse alternate planes defined by a peak and valley of an axial tooth of the inner frame and a peak and valley of an axial tooth of the outer frame in order to provide alternate louvered openings at non-transversed planes. The inner frame, the outer frame, and the louvers may comprise material including but not limited to metal. In some embodiments, the inner frame, the outer frame, and the louvers comprise material, and the louvers are welded to the inner frame and the outer frame.

The disclosed devices typically include a particle trap. In some embodiments, the particle trap comprises a louvered deflector vane for deflecting the particulate matter into the opening of the particle trap as the particulate matter is directly radially outward from the louvered openings.

The disclosed devices typically include an upstream inlet and a downstream outlet, in some embodiments, the diameter of the upstream inlet is less than the diameter of the device such that exhaust gas flow expands as it exits the inlet into the device. The downstream outlet also may have a diameter that is less than the diameter of the device. In some embodiments, the downstream outlet is at least partially positioned inside of the device such that the imparted spiral flow of exhaust gas exiting the louvered opening is around the downstream outlet in a circular manner. In further embodiments, the downstream outlet may have an upstream opening for receiving exhaust gas flow where the upstream opening is positioned upstream of the particle trap. In such embodiments, particulate matter may be directed circularly around the downstream outlet such that particulate matter is forced into the particle trap and not through the downstream outlet.

Also disclosed are methods for removing, particulate matter from an exhaust stream. The methods include passing the exhaust stream through the presently disclosed devices and collecting particulate matter front the exhaust stream as the exhaust stream passes through the devices. In some embodiments of the methods, at least about 80%, 90% 95%, 96%, 97%, 98%, 99%, or 100% of the particulate matter is removed from the exhaust stream as it passes through the devices. In further embodiments of the methods, the exhaust stream exhibits a pressure drop of less than about 1800, 1700, 1500, 1400, 1300, 1200, 1100, 1000, 900, 800, 700, 600, or 500 Pa as the exhaust stream passes through the device.

DETAILED DESCRIPTION

Disclosed are devices having low pressure drop, high efficiency spark or particulate arresting features and muffler features. The disclosed devices further may he described by the following definitions and figures.

Unless otherwise noted, the terms used herein are to be understood according to conventional usage by those of ordinary skill in the relevant art. In addition to the definitions of terms provided below, it is to be understood that as used in the specification, embodiments, and in the claims, "a", "an", or "the" can mean one or more, depending upon the context in which it is used. For example. "an element" should be interpreted to mean "one or more elements," depending upon the context in which it is used.

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus ≤10% of the particular term and "substantially" and "significantly" will mean plus or minus >10% of the particular term, unless defined as otherwise herein.

In some embodiments, the devices and elements disclosed herein may be "cylindrical" or "substantially cylindrical," In some embodiments, a device that is "cylindrical" or that is "substantially cylindrical" may have a maximum diameter in transverse cross-section ($d_{max}$)) and a minimum diameter in transverse cross-section ($d_{min}$) meeting the equation (($d_{max}$-$d_{min}$)/$d_{max}$≤20%, 10%, 5%, or 0%.

In some embodiments, the devices and elements disclosed herein may be "frustoconical" or "substantially frustoconical." As used herein, "frustoconical" means having the shape of a cone or a frustrum, where a frustrum is the basal part of a cone formed by cutting off the top of the cone by a plane parallel to the base of the cone.

As used herein, the terms "include" and "including" have the same meaning as the terms "comprise" and "comprising." These terms should be interpreted to be "open-ended" unless otherwise specified. The terms "consisting of" or "consisting essentially of" should be interpreted to be "closed-ended" unless otherwise specified.

Figure 1:
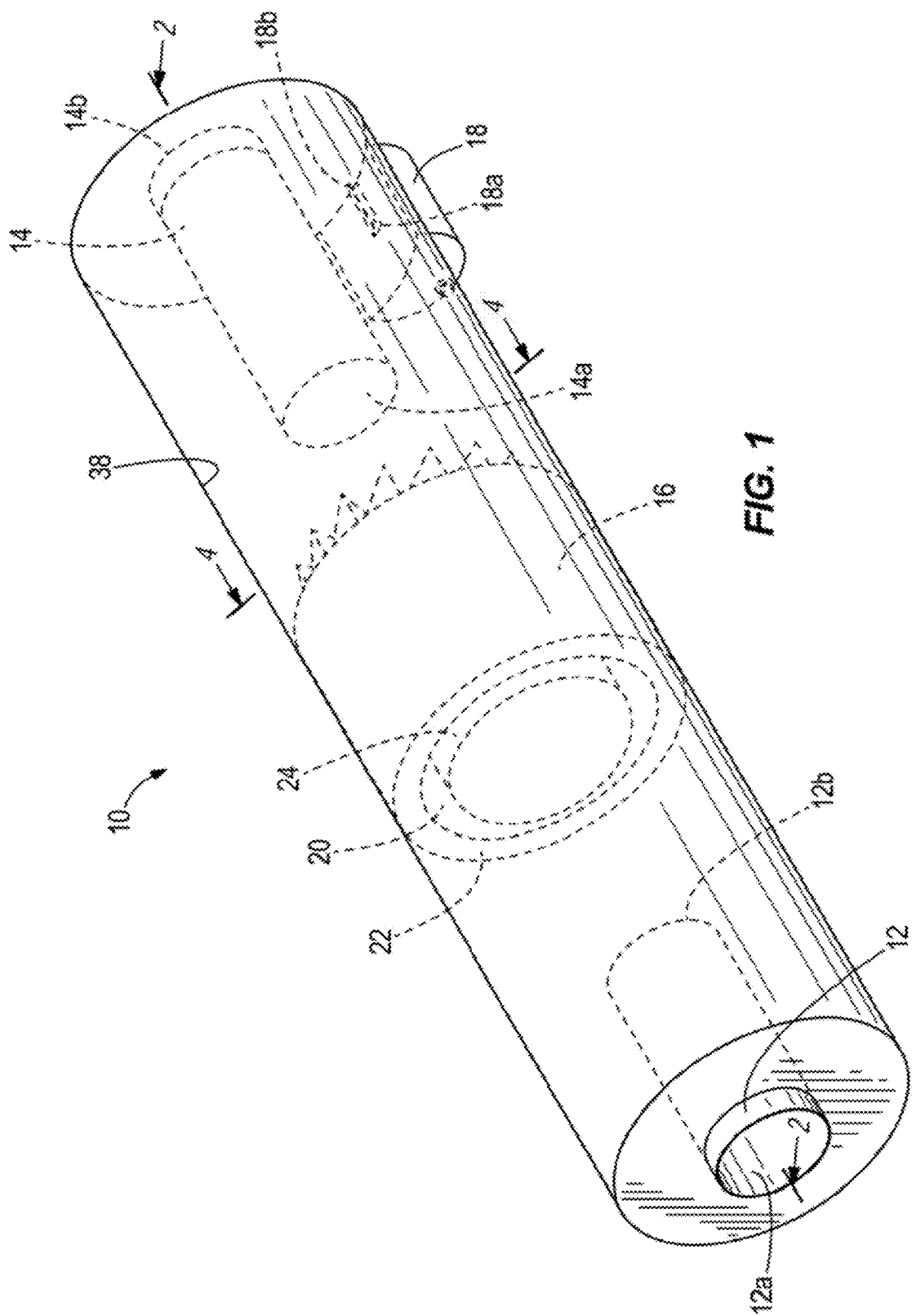
FIG. 1 illustrates one embodiment of a device as contemplated herein.

Referring now to the figures, FIG. 1 illustrates one embodiment of a device 10 as contemplated herein. The device 10 includes an upstream inlet 12 for receiving exhaust gas flow and a downstream outlet 14 for discharging exhaust gas flow. The device 10 further includes an acoustic silencer element 16 disposed between the upstream inlet 12 and the downstream outlet 14 for absorbing sound from the exhaust gas flow. The device 10 also includes a particle trap 18 having an opening 18b for collecting particulate matter 26 in the exhaust gas flow. The particle trap 18 is disposed downstream of the acoustic silencer element 16 on a wall 38 of the device 10. The acoustic silencer element 16 has an annular channel 20 permitting axial flow of gas therethrough from an upstream end of the annular channel through a downstream end of the annular channel. The downstream end of the annular channel 20 may be configured to have louvered openings 30 (see FIGS. 2-4) for discharging exhaust gas flow and imparting a spiral flow to the discharged gas flow (see, e.g., FIG. 3) such that the particulate matter 26 is forced radially outward via centrifugal force towards the wall 38 of the device 10 where the particulate matter 26 is collected in the particle trap 18 (see FIG. 3).

As illustrated is the figures, the acoustic silencer element 16 of the device 10 includes an outer sound absorptive element 22 positioned adjacent to an inner wall 38 of the device 10 and forming a cylindrical sleeve. Also as illustrated in the figures, the acoustic silencer element 16 of the device 10 includes an inner sound absorptive element 24 positioned inside the outer sound absorptive element 22 and forming a cylindrical body. (See FIGS. 1-3). The outer sound absorptive element 22 and the inner sound absorptive element 24 are spatially positioned relative to each other to form therebetween the annular channel 20 of the acoustic silencer element 16. (See FIGS. 1-3).

The illustrated acoustic silencer element 16 further includes a perforated cylindrical liner 42 positioned between the outer sound absorptive element 22 and the inner sound absorptive element 24. The perforated, cylindrical liner 42 lines the annular channel 20. (See FIG. 2). The perforated cylindrical liner 42 also supports an inner surface of the outer sound absorptive element 22 and supports an inner surface of the inner sound absorptive clement 24 such that the outer sound absorptive element 22 and the inner sound absorptive element 24 are positioned in a spaced relationship to form the annular channel 20 therebetween. Also illustrated are radial spokes 40 transversing the annular channel 20 and supporting the perforated cylindrical liner 42 and the spaced relationship of the outer sound absorptive element 22 and the inner sound absorptive element 24 (See FIGS. 2 and 4).

Figure 2:
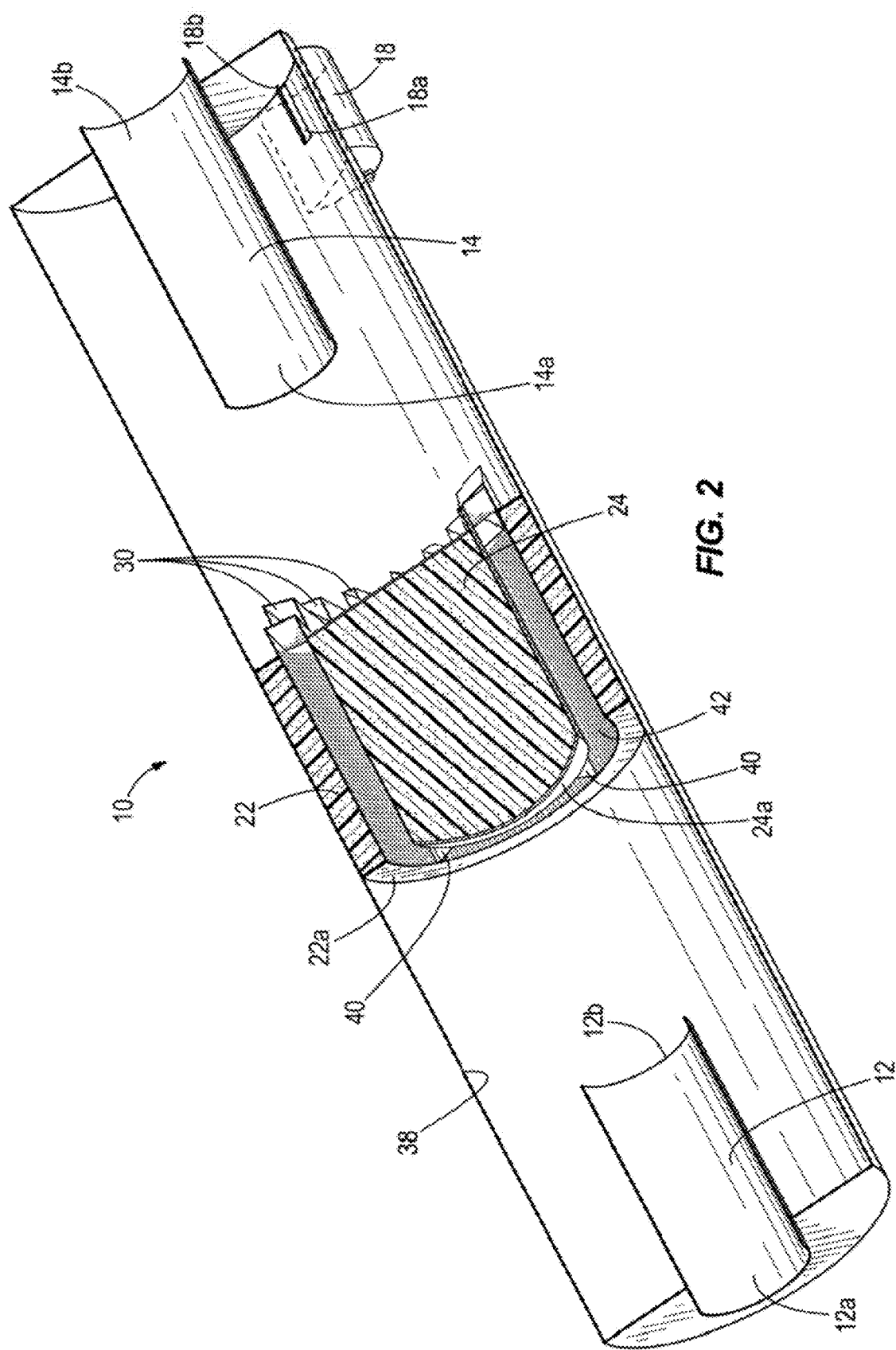
FIG. 2 illustrates a cross-sectional view of the device of FIG. 1 along 2-2.
Figure 3:
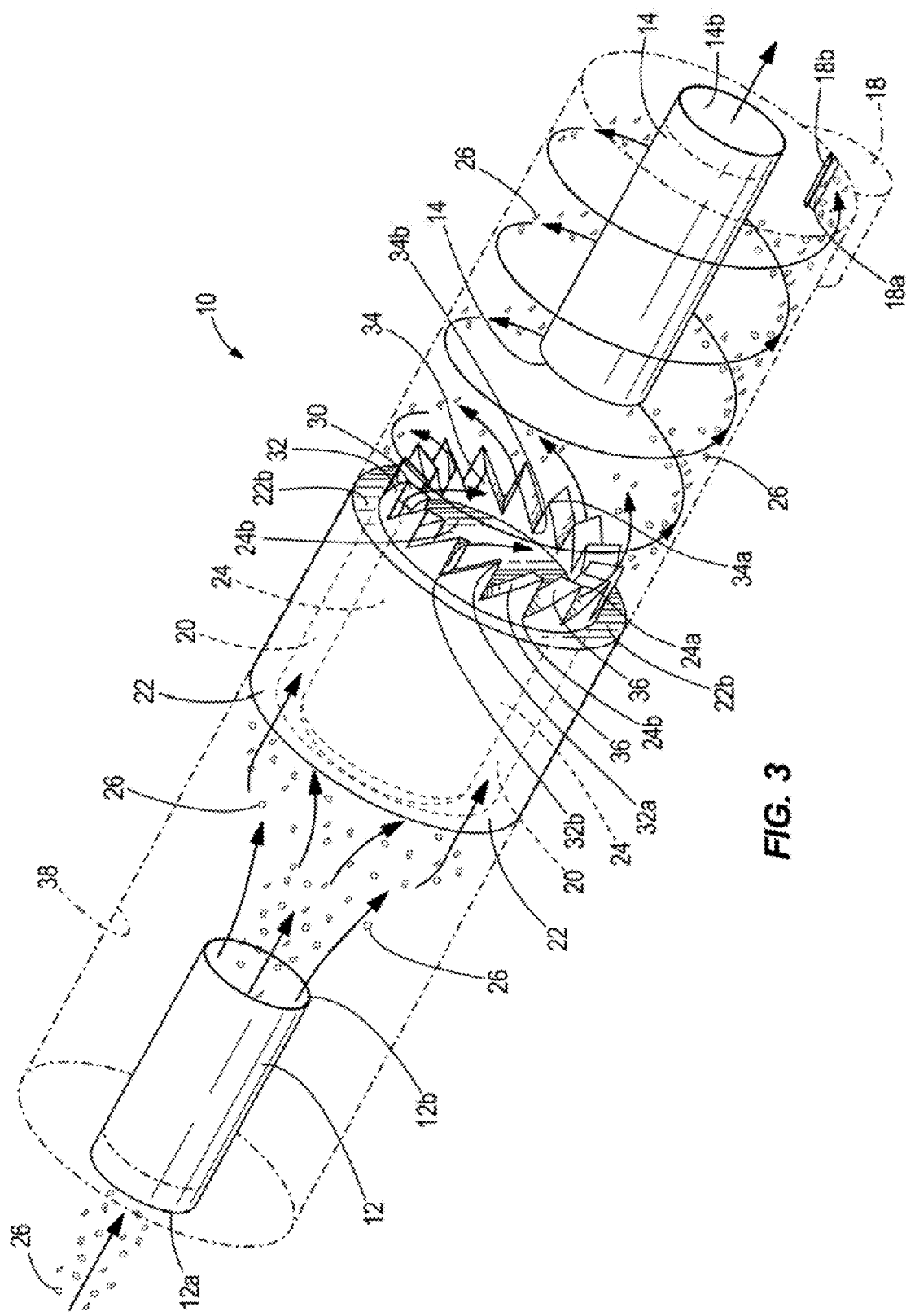
FIG. 3 illustrates art embodiment of a device as contemplated herein.

As illustrated in FIGS. 2 and 3, the outer sound absorptive element 22 of the acoustic silencing element 16 has an upstream surface and a downstream surface covered by solid rings (22a and 22b, respectively). Also as illustrated in FIGS. 2 and 3, the inner sound absorptive element 24 has an upstream surface covered by a solid flanged and dished head 24a, and the inner sound absorptive element 24 has a downstream surface covered by a solid circular plate 24b.

As illustrated in FIG. 3, the annular channel 20 is configured to have louvered openings 30 at a downstream end for discharging exhaust gas flow and imparting a spiral flow to the discharged gas flow. The louvered openings 30 are formed by: (i) an inner cylindrical frame having axial teeth 34, the axial teeth having peaks and valleys (34a, 34b); (ii) an outer cylindrical frame having axial teeth 32, the axial teeth having peaks and valleys (32a, 32b); and (iii) louvers 36 transversing the axial teeth of the inner cylindrical frame 34 and the axial teeth of the outer cylindrical frame 32, (See FIGS. 3 and 4), The louvers 36 tranverse alternate planes defined by a peak and valley of an axial tooth of the inner cylindrical frame (34a-34b) and a plane defined by a peak and valley of an axial tooth of the outer cylindrical frame (32a-32b) in order to provide alternate louvered openings 30 at non-transerved positions.

As illustrated in FIG. 3, the particle trap 18 is present on a wall 38 of the device 10 and includes an opening 18a for collecting particulate matter 26 as it spirals around the wall 38 of the device 10. The particle trap 18 further includes a louvered deflector vane 18b for deflecting the particulate matter 26 into the opening 18a of the particle trap 18 as the particulate matter 26 is directly radially outward from the louvered openings 30.

In the disclosed device 10, the diameter of the upstream inlet 12 may be less than the diameter of the device 10 such that exhaust gas flow expands as it exits the inlet 12 into the device 10 (See FIG. 3). The downstream outlet 14 also may have a diameter that is less than the diameter of the device 10. (See FIG. 3).

As illustrated in FIG. 3, the downstream outlet 14 is at least partially positioned inside of the device 10 such that the imparted spiral flow of exhaust gas exiting the louvered openings 30 is around the downstream outlet 14 in a circular manner. Also as illustrated in FIG. 3, the downstream outlet 14 may have an upstream opening 14a for receiving exhaust has flow where the upstream opening 14a is positioned upstream of the particle trap 18. In this configuration, particulate matter 26 is directed circularly around the downstream outlet 14 such that particulate matter 26 is directed into the opening 18a of particle trap 18 by the deflector vane 18b and not through the downstream opening 14b of the downstream outlet 14.

Figure 4:
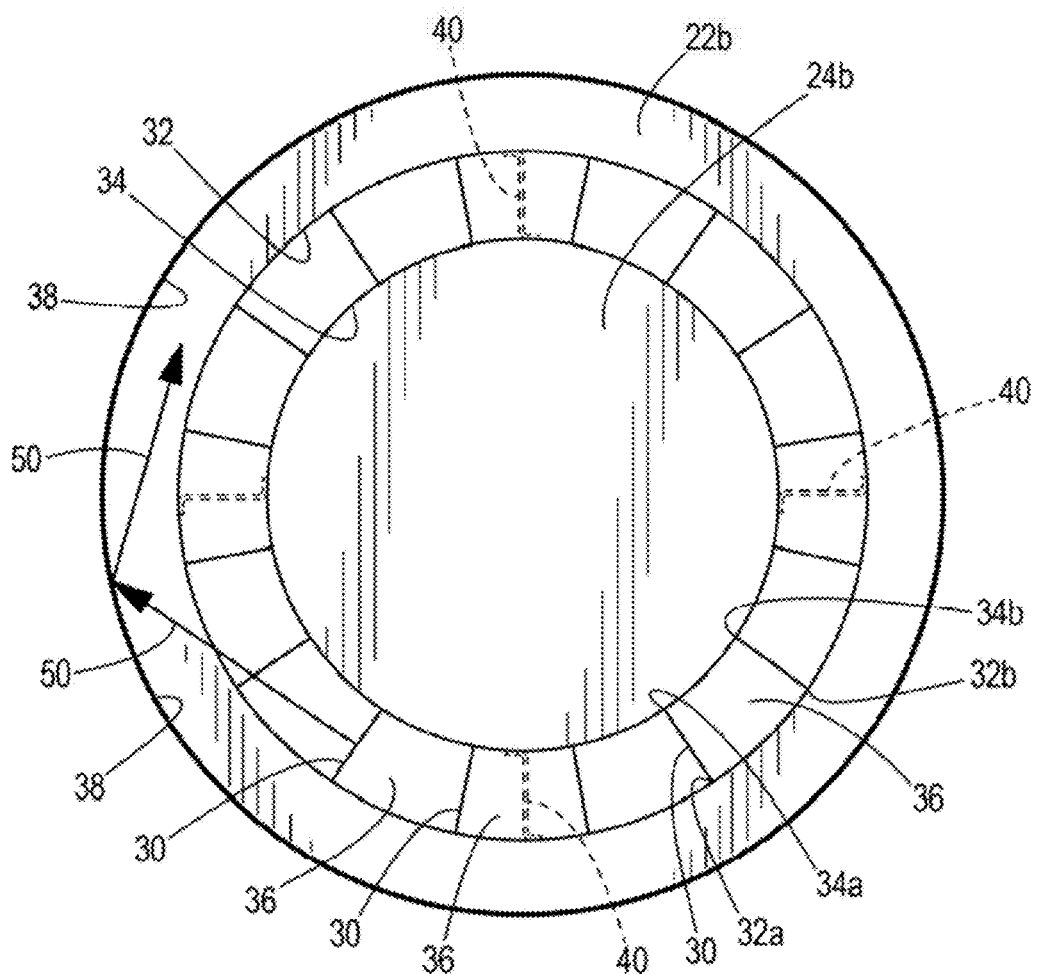
FIG. 4 illustrates a cross-sectional view of the device of FIG. 1 along 4-4.

As illustrated in FIG. 4, particulate matter 26 is directed radially outward toward an inner surface of the wall 38 of the device 10 as exhaust containing the particulate matter 12 exits the louvered openings 30 at the downstream end of the annular channel 20. As illustrated in FIG. 4, the annular channel 20 has a diameter that is less than the diameter of the device 10 such that particulate matter 26 present in exhaust gas exiting the louvered openings 30 at the downstream end of the annular channel 20 contacts the wall 38 of the device 10 (See arrows 50 in FIG. 4).

In the foregoing description, it will be readily apparent to one skilled in the art that varying substitutions and modifications may he made to the invention disclosed herein without departing from the scope and spirit of the invention. The invention illustratively described herein suitably may be practiced in the absence of any element or elements, limitation or limitations which is not specifically disclosed herein The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

What is claimed is:

1. A device comprising:
   (a) an upstream inlet receiving exhaust gas flow;
   (b) a downstream outlet discharging exhaust gas flow;
   (c) a cylindrical body disposed between the upstream inlet and downstream outlet; and
   (d) a particle trap having an opening for collecting particulate matter in the exhaust gas flow, the particle trap disposed downstream of the cylindrical body on a wall of the device;
   wherein the cylindrical body comprises an annular channel permitting axial flow of gas therethrough from an upstream end of the annular channel through a downstream end of the annular channel, and flow deflecting devices positioned at the end of the annular channel, the flow deflecting devices comprising openings for discharging exhaust gas flow such that the particulate matter is forced radially outward via centrifugal force towards the wall of the device where the particulate matter is collected in the particle trap;
   wherein the openings in the flow deflecting devices are louvered openings formed by
   (i) an inner cylindrical or frustoconical frame;
   (ii) an outer cylindrical or frustoconical frame; and
   (i) louvers transversing the inner cylindrical or frustoconical frame and the outer cylindrical or frustoconical frame; and
   wherein the inner frame comprises axial teeth having peaks and valleys, the outer frame comprise axial teeth baying peaks and valleys, and the louvers transverse alternate planes defined by a peak and valley of an axial tooth of the inner frame and a peak and valley of an axial tooth of the outer frame in order to provide alternate louvered openings at non-transversed planes.

2. The device of claim 1, wherein the inner frame, the outer frame, and the louvers comprise metal and the louvers are welded to the inner frame and the outer frame.

3. A method for removing particulate matter from an exhaust stream, the method comprising passing the exhaust stream through the device of claim 1, wherein at least about 80% of the particulate matter is removed from the exhaust stream.

4. The device of claim 1, wherein the particle trap comprises a louvered deflector vane for deflecting the particulate matter into the opening of the particle trap.

5. The device of claim 1, wherein the device and the upstream inlet having diameters such that the diameter of the upstream inlet is less than the diameter of the device and exhaust gas flow expands as the exhaust gas flow exits the upstream inlet into the device.

6. The device of claim 1, wherein the flow deflecting devices are positioned inward from the inner wall of the device.

7. The device of claim 1, wherein the downstream outlet is at least partially positioned inside of the device such that the imparted spiral flow is around the downstream outlet.

8. The device of claim 7, wherein the downstream outlet has an upstream opening for receiving exhaust gas flow, the upstream opening being positioned upstream of the particle trap.

9. The device of claim 1, wherein the cylindrical body is an acoustic silencer element comprising:

(i) an outer sound absorptive element positioned adjacent to an inner wall of the device and forming a cylindrical or frustoconical sleeve;

(ii) an inner sound absorptive element positioned inside the outer sound absorptive element, the inner sound absorptive element forming a cylindrical or frustoconical body or sleeve;

wherein the outer sound absorptive element and the inner sound absorptive element are spatially positioned relative to each other to form the annular channel therebetween.

10. The device of claim 9, wherein the outer sound absorptive element and the inner sound absorptive element comprise absorptive material having a density of about 4-8 lbs/ft$^3$.

11. The device of claim 10, wherein the absorptive material comprises mineral wool or fiberglass.

12. The device of claim 9, wherein the outer sound absorptive element has an upstream surface covered by a ring, and the outer sound absorptive element has a downstream surface covered by a ring.

13. The device of claim 12, wherein the rings covering the upstream surface and downstream surface of the outer sound absorptive element comprise metal.

14. The device of claim 9, wherein the inner sound absorptive element has an upstream surface covered by one of a circular plate, a flanged and dished head, or a cone, and the inner sound absorptive element has a downstream surface covered by a circular plate, a flanged and dished head, or a cone.

15. The device of claim 14, wherein the circular plates, the flanged and dished head, and the cone comprise metal.

16. The device of claim 9, wherein the device further comprises a perforated liner positioned between the outer sound absorptive element and the inner sound absorptive element, the perforated liner lining the annular channel.

17. The device of claim 16, further comprising radial spokes transversing the annular channel and supporting the perforated liner.

18. The device of claim 16, wherein the perforated liner has a surface area that is about 20-40% open.

19. The device of claim 16, wherein the perforated liner comprises metal.

* * * * *